United States Patent [19]
Bennett, Jr.

[11] 3,866,217
[45] Feb. 11, 1975

[54] MONITORING TRANSMISSION LINK BY COMPARING PSEUDORANDOM SIGNALS

[75] Inventor: Victor A. Bennett, Jr., Gloucester, Mass.

[73] Assignee: Currier-Smith Corporation, Bedford, Mass.

[22] Filed: Dec. 26, 1972

[21] Appl. No.: 318,419

[52] U.S. Cl. .......... 340/416, 178/69 G, 178/69.5 R, 235/194, 340/147 SY
[51] Int. Cl. .......... G08b 23/00
[58] Field of Search ..... 340/147 SY, 416, 409, 224, 340/256; 178/69.5 R, 69 G; 235/194, 150.52

[56] References Cited

UNITED STATES PATENTS

| | | | |
|---|---|---|---|
| 3,586,776 | 6/1971 | Salava | 178/69.5 R |
| 3,648,237 | 3/1972 | Frey, Jr. et al. | 178/69.5 R |
| 3,740,478 | 6/1973 | Breant et al. | 178/69.5 R |

*Primary Examiner*—Donald J. Yusko
*Assistant Examiner*—Marshall M. Curtis
*Attorney, Agent, or Firm*—Charles Hieken; Jerry Cohen

[57] ABSTRACT

A monitoring remote location has alarm sensors and a data transmitter for transmitting alarm and pseudorandom number signals over a direct line to a data detector at the monitoring central location. The monitoring location has a pseudorandom number signal generator that generates at essentially the same time the same number signals generated at the monitored location. The portable pseudorandom number signal generator at the monitored location is first brought to the monitoring location. There both pseudorandom number signal generators receive the same initial number signal at the same time to simultaneously produce the same pseudorandom sequence of digital numbers. The portable pseudorandom number generated is then taken to the monitored location and coupled to the data transmitter which also receives alarm or other signals, if any. The data detector at the monitoring location then compares the sequence of number signals received over the direct line with those locally produced by its pseudorandom number signal generator to provide a line failure signal when the number signals thus compared are not the same for a predetermined time interval.

10 Claims, 2 Drawing Figures

PATENTED FEB 1 1 1975
3,866,217
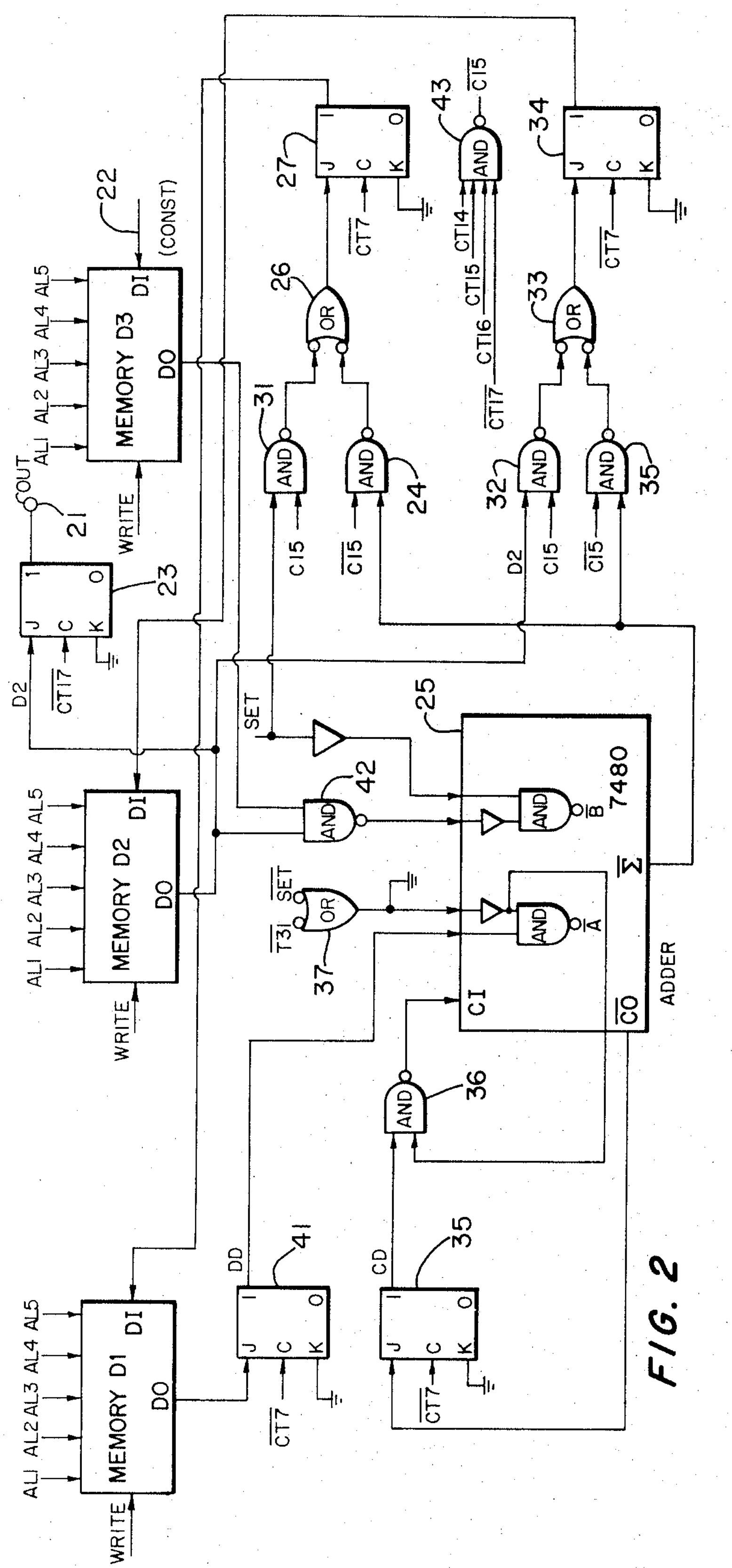
F/G. 2
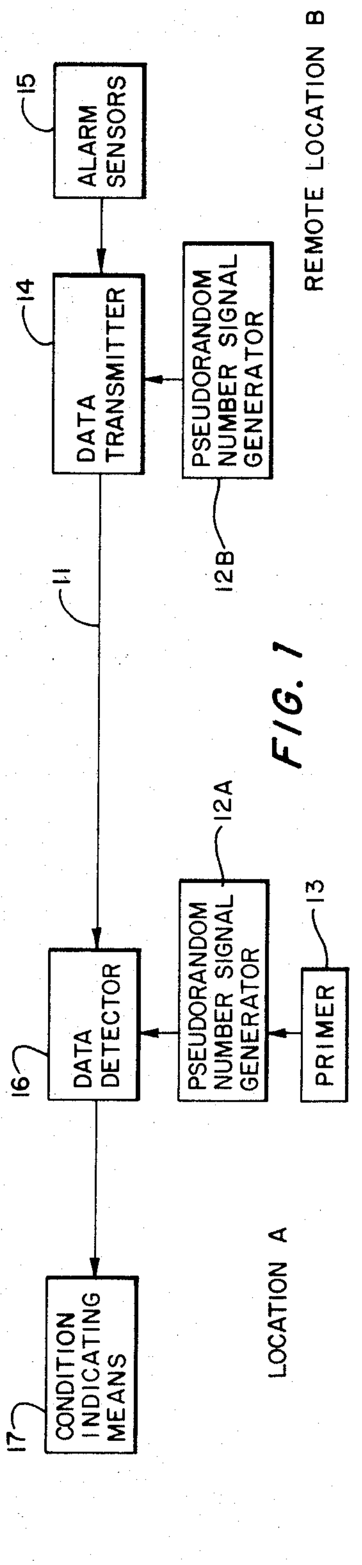
F/G. 1

MONITORING TRANSMISSION LINK BY COMPARING PSEUDORANDOM SIGNALS

BACKGROUND OF THE INVENTION

The present invention relates in general to monitoring communication links and more particularly concerns novel methods and means for monitoring communication links with a high degree of certainty that the link security cannot be defeated.

It is common practice to monitor at a central location communication links to remote locations for alarm conditions. One of the problems with such systems is that sophisticated intruders are able to prevent the central station from detecting a real alarm condition by various techniques.

Accordingly, it is an important object of this invention to provide methods and means for insuring the integrity of a communication link between monitored location and a monitoring location.

It is a further object of the invention to achieve the preceding object with techniques that make it difficult for one having knowledge of how the system works to defeat it.

It is still a further object of the invention to achieve one or more of the preceding objects with techniques that may be readily implemented with apparatus having relatively high reliability.

SUMMARY OF THE INVENTION

According to the invention there are first and second means for generating a like sequence of pseudorandom signals upon receiving the same prime signal. The same prime signal is inserted into both the first and second means for generating pseudorandom signals at the same time and at the same location so that both generate the same sequence of pseudorandom signals at essentially the same time. The second means for generating psuedorandom signals is then transported to a location to be monitored. The signals from the second means for generating pseudorandom signals is then transmitted over a communications link to the location where the prime signal was inserted and compared with the pseudorandom signal being generated by the first means for generating pseudorandom signals. If the pseudorandom signals thus compared are not the same for a predetermined time interval, a signal is provided to indicate an unacceptable condition.

Numerous other features, objects and advantages of the invention will become apparent from the following specification when read in connection with the accompanying drawing in which:

BRIEF DESCRIPTION OF THE DRAWING

FIG. 1 is a block diagram illustrating the logical arangement of a system according to the invention; and FIG. 2 is a block diagram illustrating the logical arrangement of a preferred pseudorandom number signal generator according to the invention.

DETAILED DESCRIPTION OF PREFERRED EMBODIMENTS

With reference to the drawing and more particularly FIG. 1 thereof, there is shown a block diagram illustrating the logical arrangement of a system according to the invention in which a monitoring or central location A continuously monitors the condition of direct line 11 from the monitored remote location B to provide an indication of an unacceptable condition.

Both the central location A and the remote location B include like pseudorandom number generators 12A and 12B. The central location also includes a primer pseudorandom number generator 13 that establishes the same initial conditions in pseudorandom number generators 12A and 12B in a manner to be described below so that both generators 12A and 12B provide the same sequence of pseudorandom number signals at substantially the same time. A data transmitter 14 at location B transmits these number signals along with any signals from alarm sensors 15 over direct line 11 to data detector 16 at central location A. Data detector 16 includes means for comparing pseudorandom number signals provided by generator 12A with those transmitted over direct line 11 from gneerator 12B to provide an indication to condition indicating means 17 that is unacceptable when the number signals are not the same for a predetermined time interval.

In order to avoid obscuring the principles of the invention details of specific apparatus such as modems that may comprise data transmitter 14 and data detector 16 and the comparator comprising data detector 16 are omitted.

The number signals provided by generators 12A and 12B preferably have a very long period so that even if an intruder had access to the transmitted information, it would be very difficult to predict the sequence of numbers to follow. Those skilled in the art know how to effect generation of such a sequence with available digital computers and known programming techniques. Thus, pseudorandom number generators 12A and 12B could be identical digital computers programmed the same, operating at the same clock rate and starting with the same initial conditions at the same time. There are numerous techniques for establishing the same clock rate. For example, both clock rates could be maintained in synchronism by reference to an exceptionally stable frequency source, such as an atomic clock, radio station WWV or even power line frequency. Alternately, each clock source could include a very stable crystal or other oscillator and the clock rate at the central location could be modified slightly to conform to that at the remote location by sensing the intervals between pulses making up the transmitted random numbers indicative of the remote location clock rate.

In practicing the invention portable pseudorandom number signal generator 12B is initially at central location A. Primer pseudorandom number generator 13 injects the same initial condition at the same time into pseudorandom number generators 12A and 12B. No one knows the initial number signal injected into generators 12A and 12B. Both then simultaneously generate the same sequence of pseudorandom number signals. Portable pseudorandom number generator 12B is then transported to remote location B, coupled to data transmitter 14, and data transmitter 14 then transmits the sequence of pseudorandom number signals over direct line 11 to data detector 16.

If both pseudorandom number signal generators 12A and 12B have clock pulse rates synchronized with either the same reference source or a respective atomic clock, the time between being primed and being coupled to data transmitter 14 is not important. However, if the central station clock rate is to be synchronized with that at the remote location, it is preferred that portable pseudorandom number generator 12B be coupled to data transmitter 14 so that the difference between the clock rates at central and remote locations is not outside that which data detector 16 can tolerate and still recognize the number signals as the same. As a practical mattter, relatively economical crystal oscillators are available so that the interval between priming and connection of portable pseudorandom number generator 12B to data transmitter 14 may be many hours.

In a preferred embodiment of the invention an 8-bit random number signal is transmitted about every two seconds over direct line 11 having a line current maintained between 10 and 40 mA. A typical ONE data pulse comprises a current drop of about 2 mA. for 150 ms.

If four number signals are transmitted in succession that do not agree with the corresponding number signals generated by generator 12A, condition indicator 17 indicates an unacceptable condition. It may be advantageous to restore the condition to acceptable if thereafter 16 successive bits are received that are the same as those provided by number signal generator 12A. This restoration of the acceptable condition may be advantageous in avoiding false alarms. Thus, an alarm condition is indicated when identity has not occurred for about 10 seconds but may then be made acceptable if there follows an interval of 10 seconds in which the transmitted number signals agree with those provided by generator 12A.

To avoid the possibility that a disturbance could occur during the interval when condition indicator 17 indicates an unacceptable condition because of lack of identity, data transmitter 14 could include a scrambler that sends a forced alarm condition over direct line 11 when a disturbance occurs during the interval just prior to indicating an unacceptable condition. Such scrambling means may comprise means responsive to the occurrence of an alarm condition for inhibiting the transmission of ONE's which data detector 16 immediately recognizes as an unacceptable condition. The specific apparatus for producing and detecting such a forced alarm code is within the skill of one having ordinary skill in the encoding-decoding art and not a part of this invention.

Referring to FIG. 2, there is shown a block diagram illustrating the logical arrangement of key elements is portable pseudorandom number signal generators 12A and 12B. Certain apparatus such as buffers, clock pulse generators and the like have been omitted to avoid obscuring the principles of the invention. The apparatus is repetitively sequenced thru 16 cycles to produce from memory D2 one pseudorandom number in serial form as an output on line 21 for every sequence of 16 cycles. The apparatus comprises memories D1 and D2 carrying numbers that charge and memory D3 that receives on input 22 the initial data number signal from primer 13 and does not change until it is desired to establish a new initial state for a pair of pseudorandom number generators. Means may also be provided for destroying the data in register D3 when the cover of a generator is removed.

Each of the memories may typically comprise a conventional commercially available MOS 32-bit memory having five address lines AL1–AL5, a data imput line DI for receiving input data, a WRITE line for receiving an enabling signal that causes the data on the input line DI to be recorded in the binarily designated address determined by the potentials on address lines AL1–AL5, and an output line DO where is available the data bit then stored in the location designated by the address signal applied to the address lines. The address lines of each memory may be coupled to respective stages of a five-stage binary counter whose state then designates the selected memory location in each memory.

In a preferred form of the invention memories D1 and D2 carry 32-bit numbers and memory D3 carries a number in which the first three bits are permanently selected and the remaining thirteen bits are supplied by primer 13 because the number stored in memory D3 is to be used as a multiplier that should be finite. The system functions to progress through 16 cycles to accumulate the sum of the first fifteen partial products in memory D1 and add the last partial product to that stored in memory D1 and produce the product of the D1 and D2 numbers for storage in memory D2 as the multiplicand for the next set of 16 cycles.

Initially memories D1 and D2 carry all ones and memory D3 carries the multiplier comprising the three fixed bits and the thirteen bits provided by primer 13. Thereafter the apparatus functions to multiply the number stored in memory D2 each bit stored in memory D3 to form 15 partial products that are added to the number stored in memory D1 and transferred to memory D1. On the sixteenth cycle this resultant sum is transferred to register D2 which represents the product of the number previously stored in memory D2 and the constant stored in memory D3. The process just described occurs very rapidly. Thereafter, the address counter associated with memory D2 is stepped through its first eight steps to provide at output line 21 through J-K flip-flop 23 the eight least significant bits then in memory D2.

The specific technique for generating the various timing signals are well-known in the art and are not specifically illustrated to avoid obscuring the principles of the invention.

When the cycle is not cycle 15, AND gate 24 is enabled to transmit the output of adder 25 through OR gate 26 to J-K flip-flop 27 which transmits the partial sum to the input of memory D1 with its WRITE line then enabled. The WRITE lines of memories D1 and D2 are enabled during the multiplication cycle, and the WRITE line of memory D3 is only enabled when it receives a pseudorandom number signal from primer 13.

The CT7 timing signal is typically a square wave having 32 periods for each cycle with each period corresponding to the bit period. The bar above the signal levels designated CT7 indicates the complement of CT7 resulting in the data bit stored in an associated J-K flip-flop being ejected half a bit period after entering in accordance with conventional techniques.

The output of adder 25 is the complement of the sum of the A side inputs and the complement of the B side input. OR gate 26 coacts with the enabled one of AND gates 24 and 31 to provide the desired sum at the input of J-K flip-flop 27. When cycle 15 occurs, AND gate 31 is enabled to transmit zeros to memory D1. The SET level is only present when memory D3 is being loaded so that register D1 then receives all ONES. Memory D2 also receives all ONES because the SET complement level applied to OR gate 37 coacting with adder 25, enabled AND gate 35, OR gate 33 and J-K flip-flop 34 injects ONES into memory D2.

For all cycles except cycle 15 AND gate 32 is enabled to recirculate the binary number in memory D2 through AND gate 32, OR gate 33 and J-K flip-flop 34 back into memory D2. On cycle 15 AND gate 32 is disabled, and AND gate 35 is enabled to transmit the sum provided by adder 25 into memory D2, representing the product of the constant in memory D3 and the number previously stored in memory D2.

The complement carry output CO is applied to J-K flip-flop 35 to provide a delayed carry out in response to each CT7 complement level through AND gate 36 to the carry input CI. The T31 complement signal occurs at the beginning of each cycle and functions to inject a ONE at the A input of adder 25 at the beginning of each cycle.

The output of memory D1 is coupled through J-K flip-flop 41 to the A side of adder 25. The B side receives the output of AND gate 42 corresponding to the partical product of the number stored in memory D2 with the selected stored bit in memory D3. AND gate 43 provides the C15 complement signal upon the occurrence of timing signals CT14, CT15, CT16 and the complement of timing signal CT17. The latter waveforms correspond to once, twice, four times and eight times, respectively, the bit period.

Typically each computation cycle occurs in 20.48 milliseconds with the interval between computations being 2.62144 seconds in which bits may be transmitted with each bit interval being typically 327.68 milliseconds. During data transmission the address counter associated with memory D2 is stepped at this data transmission rate and the output data delivered to output flip-flop 23 for delivery to output line 21. The CT17 complement signal applied to J-K flip-flop typically occurs at a rate faster than the change in data provided by memory D2. The signal for ejecting the data stored in output flip-flop 23 may be at a lower frequency so long as it is not less than the desired data transmission rate and occurs so as to eject from flip-flop 23 the data signal previously entered.

The specific arrangement illustrated in FIG. 2 is by way of example only for illustrating a preferred form of pseudorandom number generator. By selecting for transmission the least significant digits produced at the end of a cycle, the most rapidly changing bits are selected for transmission. Repetition of the sequence of numbers occurs only after a very long time interval.

There has been described novel techniques and apparatus for monitoring a communication link to insure its security It is evident that those skilled in the ary may now make numerous uses and modifications of and departures from the specific techniques and apparatus disclosed herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A method of monitoring a communication link to detect a change from a normal to an abnormal condition in said communication link which method includes the steps of, establishing the same initial conditions in like first and second pseudorandom signal generating means at a first location to provide first and second like pseudorandom signals respectively occurring at substantially the same time, transporting said second pseudorandom signal generating means to a second location, transmitting said second pseudorandom signal over said communication link between said second location and said first location, comparing the transmitted second pseudorandom output signal with said first pseudorandom output signal at said first location, and providing an indication when the latter signals differ for more than a predetermined time interval.

2. A method of monitoring a communication link in accordance with claim 1 wherein said first and second pseudorandom signals are representative of digital numbers.

3. A method of monitoring a communication link in accordance with claim 1 wherein the step of establishing the same initial conditions in said first and second psuedorandom signal generating means includes injecting the same unknown pseudorandom number signal into both said first and second pseudornadom signal generating means.

4. A method of monitoring a communication link in accordance with claim 3 which method includes the steps of establishing the same unknown randomly generated number signal in a primer source, and coupling said unknown signal from said primer source to both said first and second pseudorandom signal generating means at substantially the same time.

5. Apparatus for monitoring a communication link to detect a change from a normal to an abnormal condition in said communication link comprising, first and second like pseudorandom signal generating means for producing first and second like psuedorandom signals, means defining a communications link for transmitting said second pseudorandom signal from a second location to a first location of said first source, data transmitting means at said second location for transmitting said second pseudorandom signal over said communications link to said first location, and data detecting means at said first location for comparing said first pseudorandom signal with the transmitted second pseudorandom signal to provide an indication of an unacceptable condition when the latter two signals differ for more than a predetermined time interval.

6. Apparatus in accordance with claim 5 wherein said pseudorandom signal generating means comprise means for generating digital pseudorandom signals representative of digital numbers and further comprising, prime pseudorandom signal generating means for providing an unknown pseudorandom number signal as an initial condition signal, and means for storing said unknown pseudorandom number signal in both said first and second pseudorandom signal generating means at substantially the same time so that they thereafter provide the same sequence of digital number signals at substantially the same time.

7. Apparatus in accordance with claim 6 wherein said first and second pseudorandom signal generating means each comprise, first memory means for storing said unknown pseudorandom number signal, second memory means for storing a multiplicand digital number signal, third memory means for accumulating partial product signals, means for successively multiplying said multiplicand digital number signal by each digit of the number signal stored in said first memory means to provide a succession of partial product signals, means for adding the partial product signals to the digital number signal stored in said third memory means to provide an accumulated partial product signal, means for storing the first through the penultimate of said accumulated partial product signals in said third memory means, and means for storing the last of said accumulated partial product signals in said second memory means.

8. Apparatus in accordance with claim 7 and further comprising means for transmitting a predetermined sequence of digital number bit signals stored in said second memory means of said second pseudorandom signal generating means to said first location, and means for comparing the latter sequence with a corresponding sequence then stored in said second memory means of said first pseudorandom signal generating means.

9. A method of monitoring a communication link in accordance with claim 3 and further including the steps of storing said unknown pseudorandom number signal in first memory means of said first and second signal generating means, storing a multiplicand digital number signal in second memory means of said first and second generating means, successively multiplying both said multiplicand digital number signals by each digit of the number signal stored in each first memory means to provide a succession of partial product signals, adding the partial product signals to digital number signals stored in third memory means of said first and second signal generating means to provide an accumulated partial product signal, storing the first through the penultimate of said accumulated partial product signals in said third memory means, and storing the last of said accumulated partial product signals in said second memory means.

10. A method of generating pseudorandom digital signals which method includes the steps of storing a multiplier digital number signal in first memory means, storing a multiplicand digital number signal in second memory means, successively multiplying said multiplicand digital number signal by each digit of the number signal stored in said first memory means to provide a succession of partial product signals, adding the partial product signals to digital number signals stored in third memory means to provide an accumulated partial product signal, storing the first through the penultimate of said accumulated partial product signals in said third memory means, and storing the last of said accumulated partial product signals in said second memory means.

* * * * *